United States Patent
Rodecker

(10) Patent No.: US 10,378,418 B2
(45) Date of Patent: Aug. 13, 2019

(54) VERTICAL HANGER ISOLATOR ASSEMBLY

(71) Applicant: The Pullman Company, Milan, OH (US)

(72) Inventor: Troy P. Rodecker, Berlin Heights, OH (US)

(73) Assignee: THE PULLMAN COMPANY, Milan, OH (US)

( * ) Notice: Subject to any disclaimer, the term of this patent is extended or adjusted under 35 U.S.C. 154(b) by 465 days.

(21) Appl. No.: 15/181,764

(22) Filed: Jun. 14, 2016

(65) Prior Publication Data

US 2016/0369684 A1  Dec. 22, 2016

Related U.S. Application Data

(60) Provisional application No. 62/183,119, filed on Jun. 22, 2015.

(51) Int. Cl.
*F16M 13/00* (2006.01)
*F01N 13/18* (2010.01)
*F16F 1/38* (2006.01)

(52) U.S. Cl.
CPC ........ *F01N 13/1822* (2013.01); *F16F 1/3814* (2013.01); *F16F 2236/12* (2013.01)

(58) Field of Classification Search
CPC .. F01N 13/1822; F16F 1/3814; F16F 2236/12

USPC ................... 248/60, 610, 636, 638; 180/89.2
See application file for complete search history.

(56) References Cited

U.S. PATENT DOCUMENTS

| | | | | |
|---|---|---|---|---|
| 6,003,897 A * | 12/1999 | Dostert | ................... | B60G 3/24 248/635 |
| 6,180,883 B1 * | 1/2001 | Copeland | ............ | H05K 5/0073 174/152 G |
| 7,678,168 B2 * | 3/2010 | Connelly | .............. | F16L 55/035 180/309 |
| 8,066,266 B2 | 11/2011 | Rodecker | | |
| 8,152,146 B2 | 4/2012 | Rodecker | | |
| 9,261,155 B2 | 2/2016 | Platus | | |
| 2006/0083585 A1 * | 4/2006 | Lew | ..................... | B62D 21/155 403/365 |

* cited by examiner

*Primary Examiner* — Gwendolyn W Baxter
(74) *Attorney, Agent, or Firm* — Harness, Dickey & Pierce, P.L.C.

(57) ABSTRACT

An isolator assembly has a housing with a bore. A resilient bushing is positioned within the bore of the housing. The bushing has a lower isolator spring element, a central region and an upper isolator spring element, wherein the central region has a smaller cross sectional area than each of the lower and upper isolator spring elements. The bushing has a bore extending at least partially axially therethrough. The lower and upper isolator spring elements are supported within axially spaced apart portions of the housing. A vertical hanger pin is secured within the bore of the bushing and projects outwardly therefrom to facilitate mounting the isolator assembly to an exhaust system component.

20 Claims, 6 Drawing Sheets

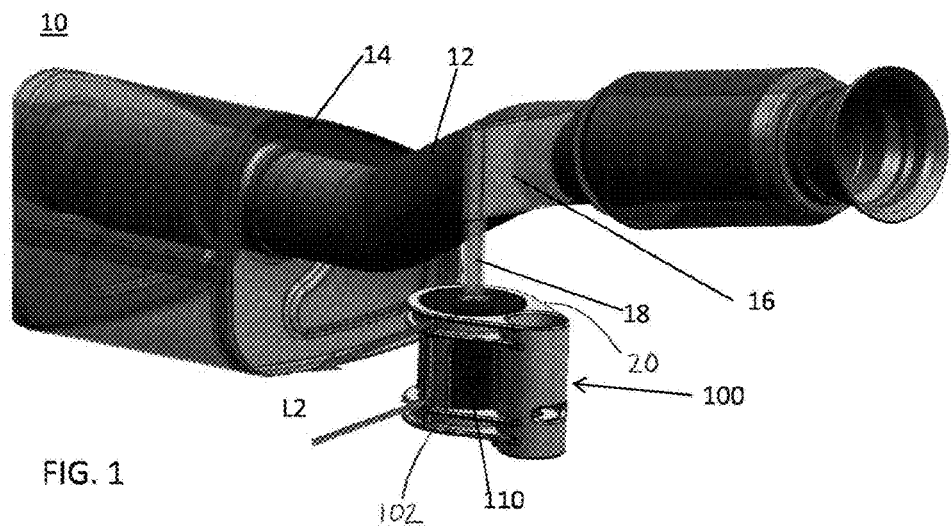
FIG. 1
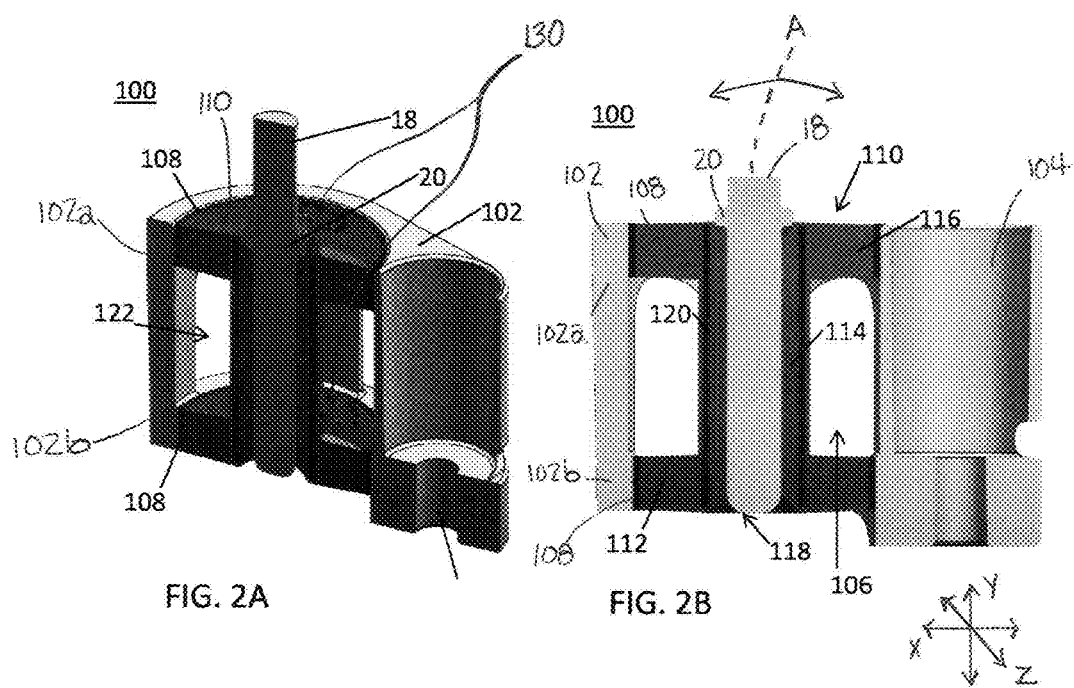
FIG. 2A
FIG. 2B

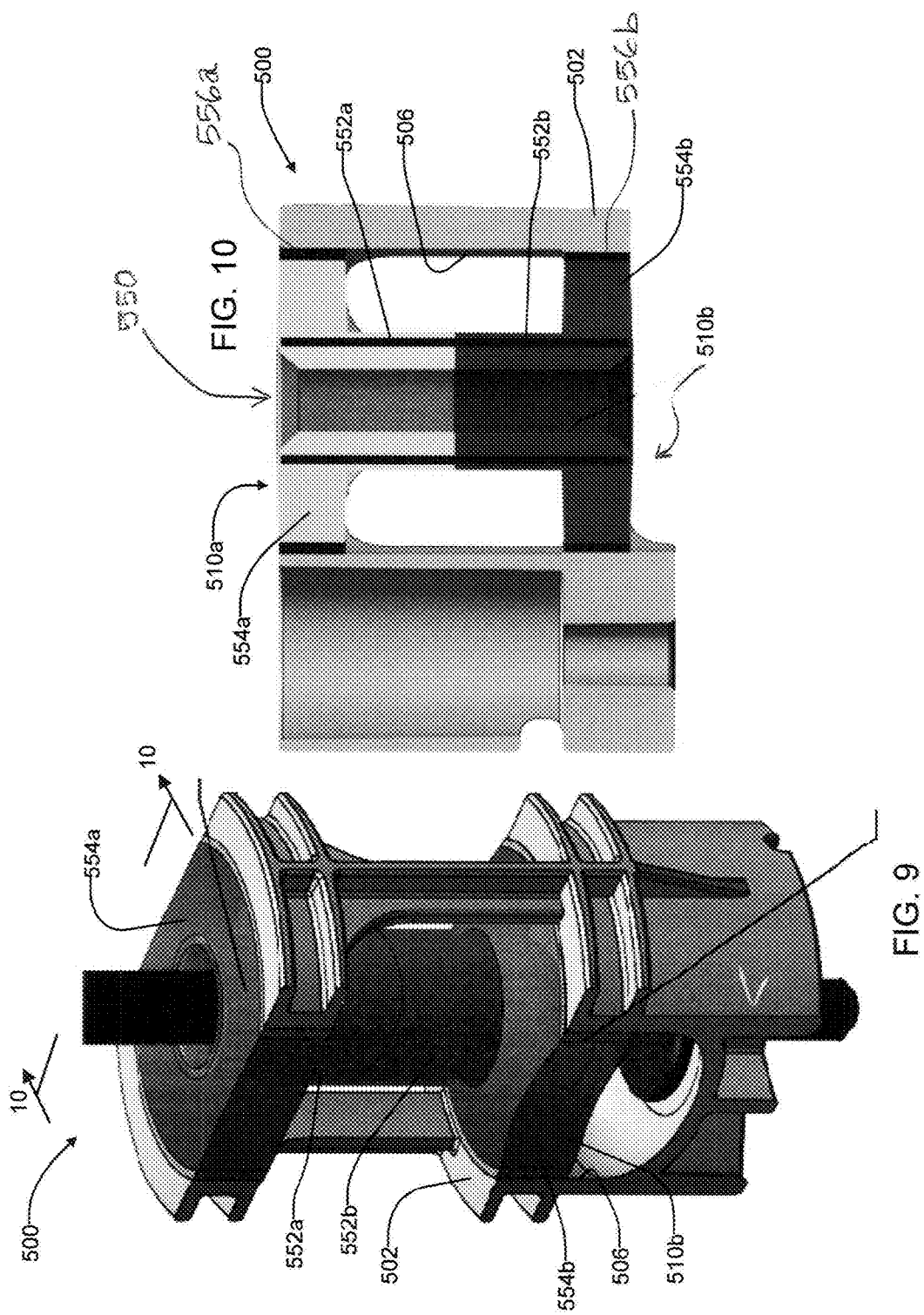

VERTICAL HANGER ISOLATOR ASSEMBLY

CROSS-REFERENCE TO RELATED APPLICATIONS

This application claims the benefit of U.S. Provisional Application No. 62/183,119, filed on Jun. 22, 2015. The entire disclosure of the above application is incorporated herein by reference.

FIELD

The present disclosure relates to a vertical hanger isolator. More particularly, the present disclosure relates to a vertical hanger isolator for an exhaust system.

BACKGROUND

Hanger isolators are commonly used in automotive exhaust systems to reduce vibration transfer between components. For example, isolators are used to reduce vibrations induced from a running engine and/or road load conditions. However, commonly available isolators are designed to offer stiffness in a single direction like a two-hole pendulum. To provide support in more than one axial direction or to provide support of a roll (twisting) motion, isolators are used in pairs. These isolator pairs could be positioned on a non-aligned axis (e.g. 90 degree axis orientation) or positioned with a parallel axis where the isolator support housings fall within the same plane. For example, in order to attain roll (twist) stability the design standard is to put two or more isolators on misaligned axes in order to create a force couple supporting roll. Furthermore, commonly available isolators, as shown in FIG. 8, do not offer any conical ortorsional stiffness, requiring the use of at least two adjacent isolators. Adding an additional isolator to provide conical stiffness increases both the weight and the cost of the system.

SUMMARY

In one aspect the present disclosure relates to an isolator assembly. The isolator assembly may include a housing having a bore, and a resilient bushing. The resilient bushing may have a lower isolator spring element, a central region and an upper isolator spring element, wherein the central region has a smaller cross sectional area than each of the lower and upper isolator spring elements. The resilient bushing has a bore extending at least partially axially therethrough. The lower and upper isolator spring elements may be supported within axially spaced apart portions of the housing. The isolator assembly may further include a vertical hanger pin secured within the bore of the resilient bushing and projecting outwardly therefrom to facilitate mounting the isolator assembly to an exhaust system component.

In another aspect the present disclosure relates to an isolator assembly having a housing having a bore, and a resilient bushing. The resilient bushing may have a lower isolator spring element, a central region and an upper isolator spring element. The central region has a smaller cross sectional area than each of the lower and upper isolator spring elements, and the resilient bushing further has a bore extending at least partially axially therethrough. The upper isolator spring element may be located within the housing at a first end of the housing and concentric with the bore in the housing. The lower isolator spring element may be located at a second end of the housing and concentric with the bore in the housing. The bore of the resilient bushing is axially aligned with the bore of the housing. A pin is disposed in the bore of the resilient bushing and extends through the upper isolator spring element, through the central region and at least partially into the lower isolator spring element.

BRIEF DESCRIPTION OF THE DRAWINGS

FIG. 1 is a perspective view of an exhaust system including a first embodiment of a hanger isolator assembly in accordance with the present invention;

FIG. 2A is an isometric cross-sectional side view of the hanger isolator assembly of FIG. 1;

FIG. 2B is a cross-sectional side view of the hanger isolator assembly of FIG. 1;

FIG. 9 is a perspective view of an isolator assembly in accordance with another embodiment of the invention, wherein a resilient bushing of the assembly is provided to two distinct component parts; and FIG. 10 is a partial cross sectional view through the isolator assembly of FIG. 10 in accordance with section line 10-10 in FIG. 9.

DETAILED DESCRIPTION

Figure 3:
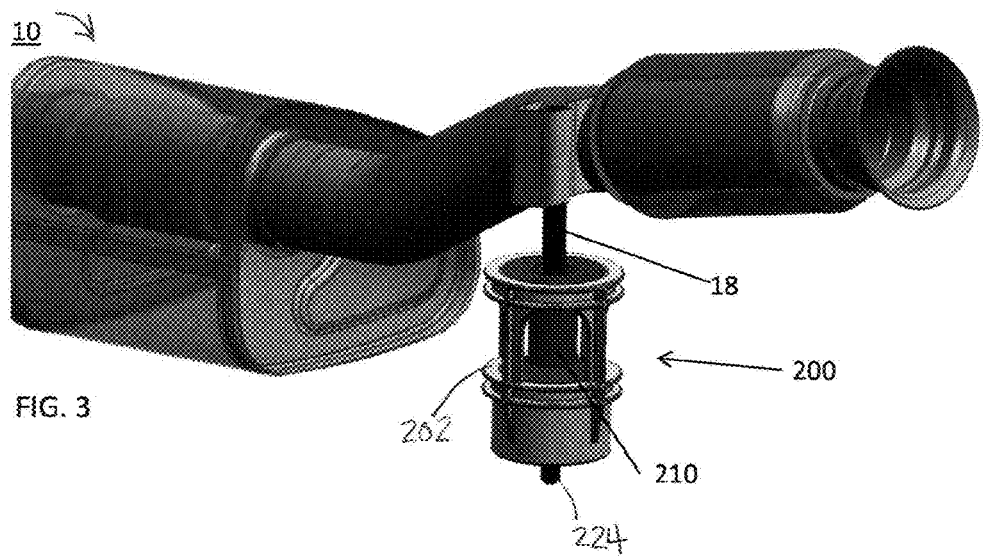
FIG. 3 is a perspective view of an exhaust system including a second embodiment of a hanger isolator assembly in accordance with the present invention.

FIG. 1 is a view of an engine exhaust system 10 including the isolator hanger assembly 100 in accordance with one or more preferred embodiments of the present invention. The engine exhaust system 10 includes an exhaust conduit 12 that interconnects different exhaust components 14 of the system 10. Exhaust components 14 can be of the types including a muffler to reduce engine noise, a Selective Catalytic Reduction, SCR, to reduce engine NOx, or even a particulate filter to reduce engine particulate matter. A vertical hanger 16 is fixedly attached to the side of conduit 12 such as by welding and includes a vertical hanger pin 18 that is positioned in in a vertical (Z) direction. The vertical hanger pin 18 also includes an annular pin collar 20, shown in FIG. 2A, with an increased diameter in relation to the pin 18.

FIGS. 2A and 2B illustrate the isolator hanger assembly 100 in greater detail. The isolator hanger assembly 100 includes a rigid housing 102 that may be coupled to a vehicle underbody through mounting portion 104, which would receive a separate bolt. In at least one embodiment, the rigid housing 102 is constructed of die cast aluminum. The rigid housing 102 includes a central bore 106 configured to receive or accommodate one or more annular support journals 108 of a resilient isolator bushing 110, which in one example may be a rubber bushing. For convenience, the resilient bushing will be hereafter referred to simply as "bushing 110".

The isolator hanger assembly 100 of FIG. 2B includes the two annular support journals 108 in a spaced apart configuration at opposing sides of the central bore 106. The support journals 108 are located in circular portions 102a and 102b of the housing 102. A rubber isolator bushing 110 is shown positioned within the central bore 106. The bushing 110 comprises a lower isolator spring element 112, a central region 114 and an upper isolator spring element 116. The bushing 110 further includes an aperture 118 through an axial center thereof. The aperture 118 is axially aligned with the central bore 106 and is configured to receive the vertical hanger pin 18 therethrough. The larger diameter of the annular pin collar 20 prevents the over-insertion of the pin 18. Optional through voids 130 in FIG. 2A may be also included for tuning stiffness in the fore-aft vehicle direction.

The lower isolator spring element 112 and the upper isolator spring element 116 are aligned to produce a resisting force couple reaction that resists the conical input of a rolling exhaust bending moment, as indicated by arcuate line "A" in FIG. 2B. The two spring elements 112,116 are designed to be soft in the X, Y and Z linear directions (i.e. side-side, up-down, front-back). For example, the X and Y support directions are coupled as the central region 114 translates toward the outer support journal 108, while the Z support direction is coupled as the central region 114 telescopes along the axis of the vertical hanger pin 18 (i.e., along the Z axis in FIG. 2B). The reduced diameter of the central region 114 in comparison to the spring elements 112, 116 provides for several significant benefits. First, it reduces the overall stiffness of the bushing 110. A bushing with high stiffness will have an increased spring rate which could prevent telescoping along the axis of the vertical hanger pin 18 (i.e., along the Z axis). Limiting the telescoping along the Z axis could lead to undesirable noise, vibration and harshness characteristics in the system. The reduced diameter of the central region 114 has the added benefit of significantly reducing the mass of the isolator hanger assembly 100, and thus material costs as well.

The vertical exhaust hanger 16 with pin 18 is fixed to the bushing 110 with a simple rubber interference fit within the inner diameter of the bushing 110. Within the bushing 110, an overmolded inner tube 120 is provided. Cutouts 122 or "windows" are provided through the rigid housing 102 exposing the internal area of the central bore 106 to allow access to the central region 114.

Figure 4A:
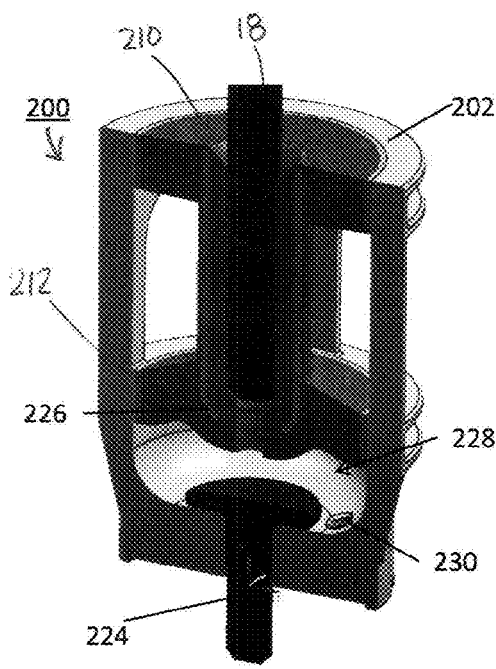
FIG. 4A is an isometric cross-sectional side view of the hanger isolator assembly of FIG. 3.
Figure 4B:
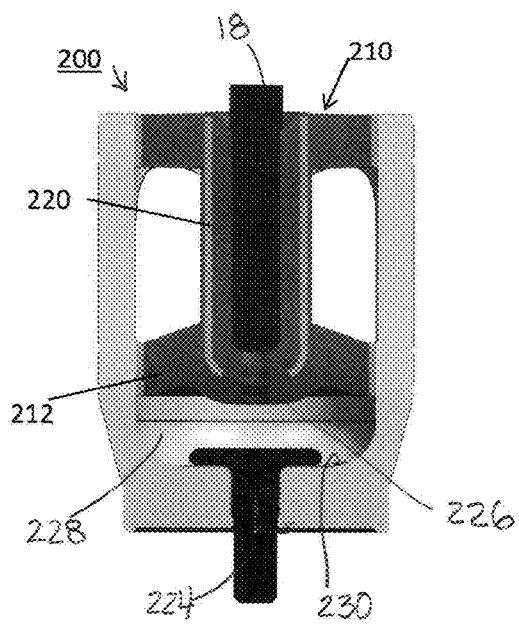
FIG. 4B is a cross-sectional side view of the hanger isolator assembly of FIG. 3.

FIGS. 3, 4A and 4B illustrate an engine exhaust system 10 including a hanger isolator assembly 200 in accordance with an alternative embodiment of the present invention. The hanger isolator assembly 200 comprises an isolator housing 202 having a mounting bolt/stud 224 and a resilient bushing 210. In this embodiment, the mounting bolt/stud 224 is axially aligned with vertical hanger pin 18. The axial alignment of the vertical hanger pin 18 and the mounting bolt/stud 224 allows the loading to be transferred from the exhaust system side of the hanger isolator assembly 200 to the body side of the hanger isolator assembly 200 without generating any additional roll or twist. Furthermore, the overmolded inner tube 220 includes a constriction 226 near the lower spring element 212 that prevents the vertical hanger pin 18 from pushing out of the lower spring element 212. As such, an annular pin collar is not required. A lower pocket 228 is provided within isolator housing 202 that provides a space between the lower spring element 212 and the mounting bolt/stud 224. The lower pocket 228 prevents the vertical hanger pin 18 from contacting the mounting bolt/stud 224 when the lower spring element 212 deforms in response to loading. Aperture 230 is provided to allow excess air to exit the lower pocket 228 to avoid any vacuum/pressure effect from application load stroking. Accordingly, only the elastomeric properties of the bushing 210 contribute to the vertical deflection of vertical hanger pin 18.

Figure 5:
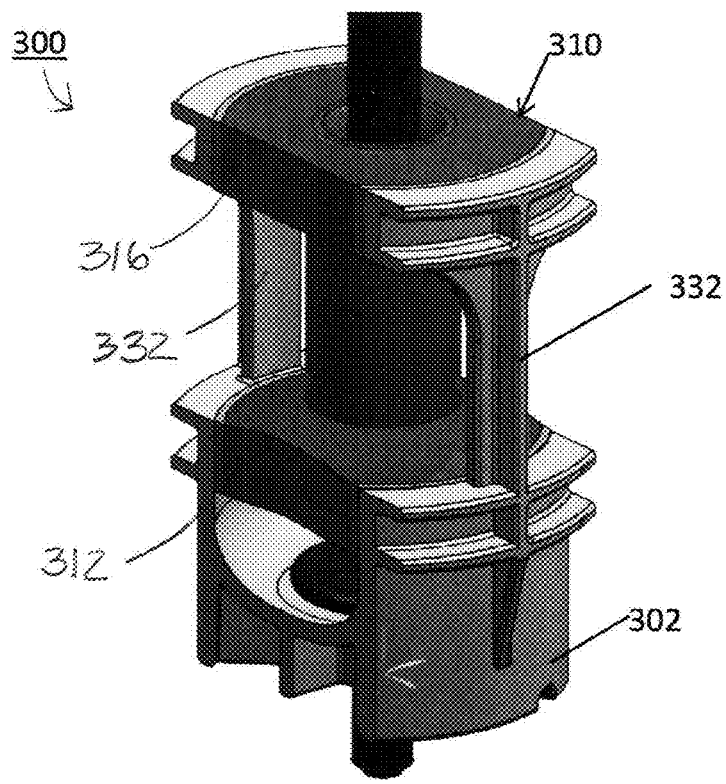
FIG. 5 is an isometric view of a third embodiment of a hanger isolator assembly in accordance with the present invention.
Figure 6:
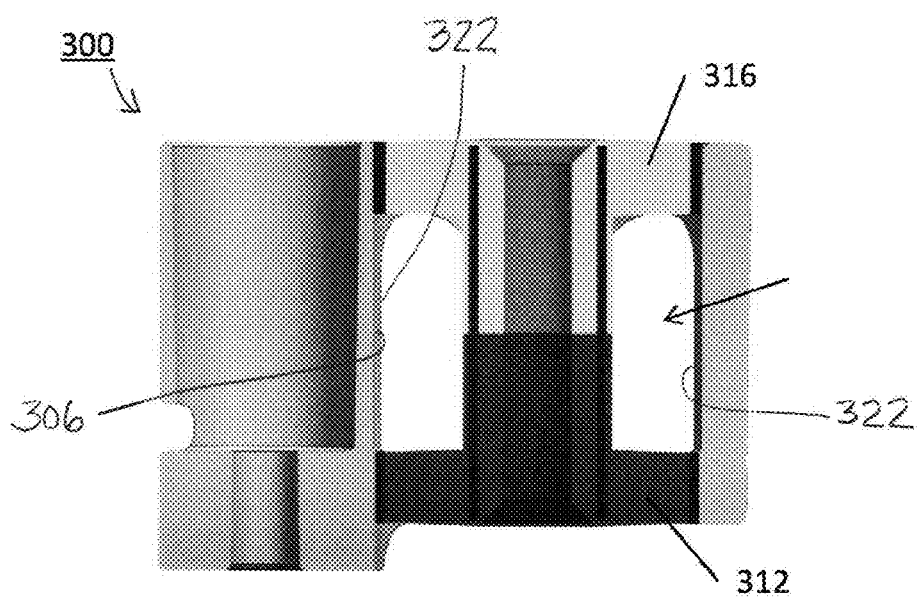
FIG. 6 is a partial cross-sectional side view of the hanger isolator assembly of FIG. 5.

FIG. 5 illustrates a hanger isolator assembly 300 in accordance with another embodiment of the present invention. Hanger isolator assembly 300 includes a two-piece resilient bushing 310 that is split into a lower isolator spring element 312 and an upper isolator spring element 316. Both of the spring elements are positioned within a bore 306 of a housing 302. The use of two spring elements 312/316 allows the lower spring element 312 to be tuned differently than the spring element 316, thus allowing for different isolation properties in different orientations. Isolator housing 302 includes reinforcement ribs 332 that further support the upper isolator spring element 316 to promote the transfer of loads around the cutouts 322. FIGS. 6 and 10 make component 110 with two PCs instead of one for simpler assembly.

Figure 7A:
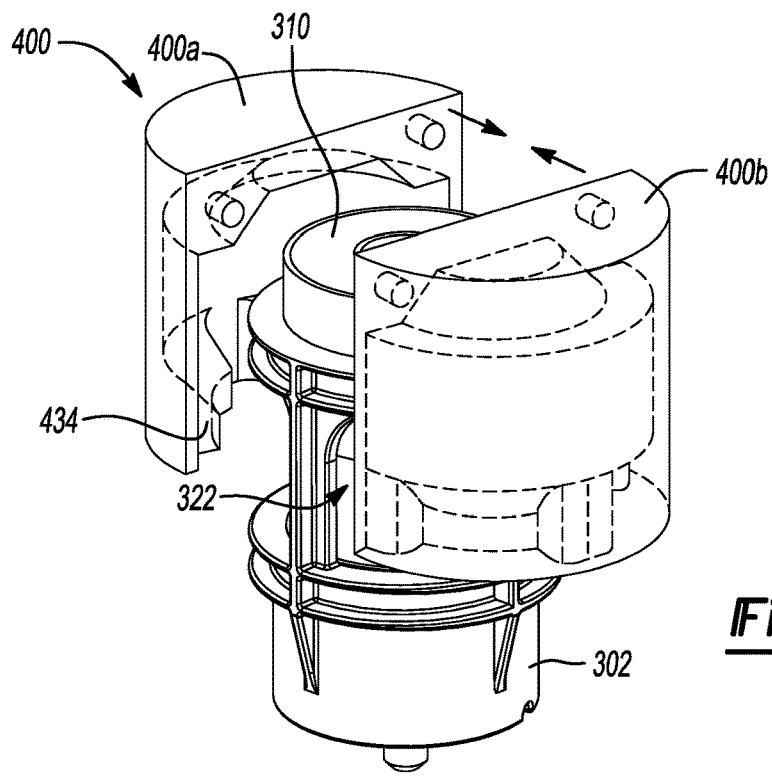
FIGS. 7A and 7B are isometric and cross-sectional views, respectively, of a method of assembling a hanger isolator assembly in accordance with the present invention.
Figure 7B:
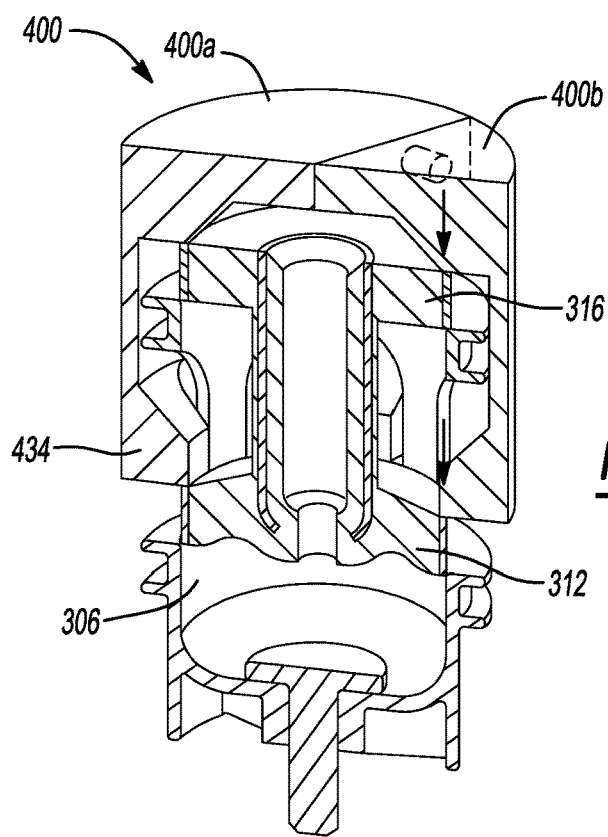
Figure 8:
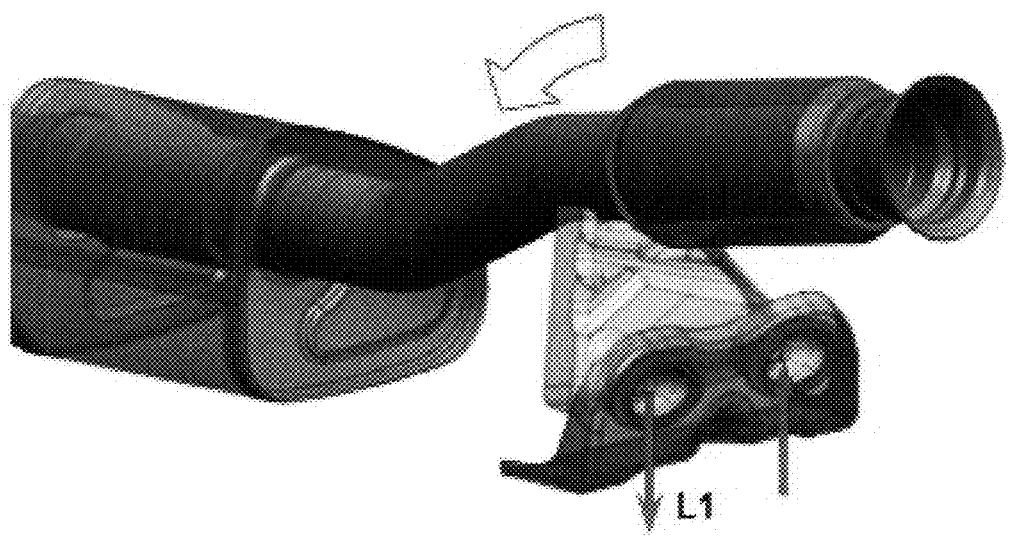
FIG. 8 is a perspective view of a prior art hanger isolator that makes use of a pair of isolators positioned within a common place.

FIGS. 7A and 7B illustrate a method of installing resilient bushing 310 to form a hanger isolator assembly 300. The method may also be used with hanger isolator assemblies 100 and 200. As illustrated, the lower isolator spring element 312 and upper isolator spring element 316 are installed into the central bore 306 of the housing 302 using an assembly tool 400. To begin assembly, lower isolator spring element 312 is placed into the bore 306. The outer diameter of the lower isolator spring element 312 is slightly smaller than the diameter of the upper isolator spring element 316 such that the lower isolator spring element 312 will easily penetrate the opening to the bore 306 but the upper isolator spring element 316 will not. Preferably, the outer diameter of the lower isolator spring element 312 is about 1 mm less than the outer diameter of the upper isolator spring element 316. Assembly tool 400 comprises two pieces 400a and 400b that fit together around the housing 302 and the bushing 310. Each piece 400a and 400b of the assembly tool 400 includes one or more protrusions 434 that align with the cutouts 322 in the housing 302 when the pieces 400a and 400b are clamped over the housing 302. As force is applied to the assembly tool 400 in the downward direction, as shown in FIG. 7B, the assembly tool 400 simultaneously forces both the upper isolator spring element 316 and the lower isolator spring element 312 downward and into a resistance fit against the housing 302. More particularly, a top inner portion of the assembly tool 400 pushes against the upper isolator spring element 316 and the protrusions 434 simultaneously apply force to the lower isolator spring element 312.

FIGS. 6 and 10 illustrate an isolator assembly 500 in accordance with another embodiment of the invention. The isolator assembly 500 in this embodiment makes use of two independent resilient bushing components, an upper bushing component 510a and a lower bushing component 510b. The bushing components 510a and 510b are positioned face to face within a bore 506 of a housing 502 to form somewhat of a "sandwich" configuration. The housing also includes a bore 550 within which a mounting vertical hanger pin 524 is press fit.

The bushing component 510a may include neck portions 552a and a bond portion 554b, and bushing component 510b may likewise include a neck portion 552b and a bond portion 554b. The two bushing components 510a and 510b are made from resilient material, for example rubber, and each could each be made from molded parts and may be press fit into the housing 502 from opposite directions. In this example each of the bond portions 554a and 554b include outer tube or sleeve portions 556a and 556b, although it would be possible to mold bond portions 554a and 554b directly within the bore 506. Alternatively, the bond portions 554a and 554b could be mechanically bonded to the wall of the bore 506, without the presence of the sleeve portions 556a and 556b, by using a suitable adhesive, or rubber interference.

Alternative embodiments of the invention could replace the two bushings with a pair of rubber sandwiches or a pair of molded parts. The two molded parts could be press fit into the housing from opposite directions. Alternatively, the rubber of the bushing could be mechanically bonded directly to the housing or molded directly to the housing itself. Additional information related to the present invention is included in the Appendix to the specification and incorporated in its entirety.

What is claimed:

1. An isolator assembly comprising:
a housing having a bore;
a resilient bushing having a lower isolator spring element, a central region and an upper isolator spring element, wherein the central region has a smaller cross sectional area than each of the lower and upper isolator spring elements, and wherein the resilient bushing has a bore extending at least partially axially therethrough;
the lower and upper isolator spring elements being supported within axially spaced apart portions of the housing; and
a hanger pin secured within the bore of the resilient bushing and projecting outwardly therefrom to facilitate mounting the isolator assembly to an exhaust system component.

2. The isolator assembly of claim 1, wherein the housing further includes a mounting portion radially offset from an axial center of the bore of the housing.

3. The isolator assembly of claim 1, wherein the bore of the resilient bushing extends at least partially into the central region, the pin extending into the central region, and wherein the central region includes an overmolded inner tube.

4. The isolator assembly of claim 3, further including a side hanger fixedly secured to the stud to facilitate mounting of the isolator assembly along a vertical axis.

5. The isolator assembly of claim 1, wherein the pin is press fit into the bore in the resilient bushing and extends at least substantially through the central region of the resilient bushing.

6. The isolator assembly of claim 5, wherein the pin includes an annular pin collar which helps to position the pin at a desired depth in the bore of the resilient bushing when the pin is press fit into the central region of the resilient bushing.

7. The isolator assembly of claim 1, wherein the housing further includes an opening at one axial end thereof, and wherein a mounting pin is secured within the opening to project axially from the housing, the mounting stud enabling the isolator assembly to be secured to a portion of a vehicle undercarriage.

8. The isolator assembly of claim 1, wherein the upper and lower isolator spring elements each have a circular configuration.

9. The isolator assembly of claim 1, wherein the central region of the resilient bushing has a circular configuration.

10. The isolator assembly of claim 1, wherein:
the upper and lower isolator spring elements have a circular configuration;
the central region of the resilient bushing has a circular configuration;
the upper isolator spring element is secured within a first journal located at an upper circular portion of the housing; and
the lower isolator spring element is secured within a second journal located at a lower circular portion of the housing.

11. The isolator of claim 10, wherein:
the pin is secured in the bore of the resilient bushing and is disposed at an axial center of the resilient bushing projecting partially outwardly from a first end of the housing; and
a mounting stud or bolt is disposed in an opening in the housing and projects outwardly from a second end of the housing, the mounting pin further being arranged co-linearly with an axial center of the resilient bushing and co-linearly with the pin.

12. The isolator assembly of claim 1, wherein the bore in the resilient bushing is concentric with the bore in the housing, and wherein the pin extends through the upper isolator spring element, through a full axial length of the central region, and at least partially into the lower isolator spring element.

13. The isolator assembly of 1, wherein the housing includes a plurality of cutouts forming windows for facilitating assembly of the resilient bushing into the housing.

14. The isolator assembly of claim 1, wherein the housing includes an opening at one axial end which allows air to flow into an out from an area of the isolator assembly defined between the housing and the lower isolator spring element.

15. The isolator assembly of claim 1, wherein the resilient bushing is formed from rubber.

16. The isolator assembly of claim 1, wherein the resilient bushing is formed in first and second independent components.

17. The isolator assembly of claim 16, wherein:
the first independent component comprises the lower isolator spring element and a lower portion of the central region; and
the second independent component comprises the upper isolator spring element and an upper portion of the central region.

18. A vertical hanger isolator assembly comprising:
a housing having a bore;
a resilient bushing having a lower isolator spring element, a central region and an upper isolator spring element, wherein the central region has a smaller cross sectional area than each of the lower and upper isolator spring elements, and wherein the resilient bushing has a bore extending at least partially axially therethrough;
the upper isolator spring element being located within the housing at a first end of the housing, and concentric with the bore in the housing;
the lower isolator spring element being located at a second end of the housing and concentric with the bore in the housing;
the bore of the resilient bushing is axially aligned with the bore of the housing; and
a stud or bolt disposed in the bore of the resilient bushing and extending through the upper isolator spring element, through the central region and at least partially into the lower isolator spring element.

19. The isolator assembly of claim 18, wherein the resilient bushing is formed in first and second independent components disposed in facing relationship to one another;
the first independent component including the lower isolator spring element and a lower portion of the central region; and
the second independent component including the upper isolator spring element and an upper portion of the central region.

20. The isolator assembly of claim 18, further including a mounting pin located on the housing and projecting axially from the housing in a direction opposite to the pin and co-linearly with the pin.

* * * * *